US011833922B2

(12) United States Patent
Ahtikari (10) Patent No.: US 11,833,922 B2
(45) Date of Patent: Dec. 5, 2023

(54) APPARATUSES AND METHODS FOR MANAGING ELECTRIC VEHICLE CHARGING STATIONS BASED ON USER LOCATION

(71) Applicant: Liikennevirta Oy / Virta Ltd, Helsinki (FI)

(72) Inventor: Jussi Ahtikari, Helsinki (FI)

(73) Assignee: LIIKENNEVIRTA OY / VIRTA LTD, Helsinki (FI)

( * ) Notice: Subject to any disclaimer, the term of this patent is extended or adjusted under 35 U.S.C. 154(b) by 0 days.

(21) Appl. No.: 18/043,005

(22) PCT Filed: Aug. 31, 2021

(86) PCT No.: PCT/FI2021/050587
§ 371 (c)(1),
(2) Date: Feb. 24, 2023

(87) PCT Pub. No.: WO2022/049327
PCT Pub. Date: Mar. 10, 2022

(65) Prior Publication Data
US 2023/0241998 A1 Aug. 3, 2023

(30) Foreign Application Priority Data
Sep. 1, 2020 (FI) .................................... 20205852

(51) Int. Cl.
*B60L 53/66* (2019.01)
*B60L 53/30* (2019.01)

(52) U.S. Cl.
CPC ........... *B60L 53/665* (2019.02); *B60L 53/305* (2019.02); *B60L 2240/72* (2013.01); *B60L 2250/20* (2013.01); *B60L 2250/22* (2013.01)

(58) Field of Classification Search
CPC ..................................................... B60L 53/665
(Continued)

(56) References Cited

U.S. PATENT DOCUMENTS

| 9,104,537 B1 * | 8/2015 | Penilla | G06Q 10/20 |
| 2010/0315197 A1 * | 12/2010 | Solomon | H02J 7/00 |
| | | | 340/5.2 |

(Continued)

FOREIGN PATENT DOCUMENTS

| CN | 105377621 A | 3/2016 |
| CN | 108944542 A | 12/2018 |

(Continued)

OTHER PUBLICATIONS

Blackstone, A., "Understanding the different types of BLE Beacons," Mbed Website, Available Online at https://os.mbed.com/blog/entry/BLE-Beacons-URIBeacon-AltBeacons-iBeacon/, Mar. 24, 2015, 6 pages.

(Continued)

*Primary Examiner* — Jerry D Robbins
(74) *Attorney, Agent, or Firm* — McCoy Russell LLP (57) ABSTRACT

Various example embodiments relate to managing charging stations of electric vehicles based on a proximity of a user. A beacon transmitter is configured to broadcast identifiers of a charging station and of a list of allowed users. A mobile device of the user is configured to detect a proximity of the beacon transmitter and determine if the charging station can be set for charging based on an identifier of the user, the identifier of the charging station and the identifier of the user list. Apparatuses, methods, and computer programs are disclosed.

11 Claims, 6 Drawing Sheets

(58) Field of Classification Search
USPC .......................................................... 320/109
See application file for complete search history.

(56) References Cited

U.S. PATENT DOCUMENTS

| | | | | |
|---|---|---|---|---|
| 2013/0046660 A1* | 2/2013 | Lowenthal | ............ | B60L 53/665 |
| | | | | 705/30 |
| 2014/0019913 A1* | 1/2014 | Newman | ............... | G06F 3/0488 |
| | | | | 715/810 |
| 2015/0015419 A1* | 1/2015 | Halker | .................. | B60L 53/305 |
| | | | | 320/108 |
| 2016/0075249 A1 | 3/2016 | Grabar et al. | | |
| 2016/0229305 A1* | 8/2016 | Shumaker | ............. | H04W 12/06 |
| 2016/0337787 A1* | 11/2016 | Palin | ........................ | H04W 4/50 |
| 2018/0061145 A1* | 3/2018 | Blustein | .................. | E05F 15/76 |
| 2018/0194242 A1 | 7/2018 | Shumaker et al. | | |
| 2019/0160957 A1 | 5/2019 | Hooker | | |
| 2019/0180336 A1* | 6/2019 | Khoo | ....................... | B60L 53/31 |
| 2021/0213848 A1* | 7/2021 | Sun | ....................... | B60L 53/305 |

FOREIGN PATENT DOCUMENTS

| | | |
|---|---|---|
| FR | 3039466 A1 | 2/2017 |
| IN | 109849726 A | 6/2019 |
| KR | 102095278 B1 | 3/2020 |

OTHER PUBLICATIONS

Finnish Patent and Registration Office, Search Report Issued in Application No. 20205852, dated Nov. 24, 2020, 1 page.
ISA European Patent Office, International Search Report Issued in Application No. PCT/FI2021/050587, dated Feb. 3, 2022, WIPO, 3 pages.
International Bureau of WIPO, International Preliminary Report on Patentability Issued in Application No. PCT/FI2021/050587, dated Nov. 14, 2022, WIPO, 13 pages.
State Intellectual Property Office of the People's Republic of China, Office Action and Search Report Issued in Application No. 202180053579.6, dated Jun. 28, 2023, 18 pages.

\* cited by examiner

APPARATUSES AND METHODS FOR MANAGING ELECTRIC VEHICLE CHARGING STATIONS BASED ON USER LOCATION

CROSS REFERENCE TO RELATED APPLICATIONS

The present application is a U.S. National Phase of International Application No. PCT/FI2021/050587 entitled "APPARATUSES AND METHODS FOR MANAGING ELECTRIC VEHICLE CHARGING STATIONS BASED ON USER LOCATION," and filed on Aug. 31, 2021. International Application No. PCT/FI2021/050587 claims priority to Finnish Patent Application No. 20205852 filed on Sep. 1, 2020. The entire contents of each of the above-listed applications are hereby incorporated by reference for all purposes.

TECHNICAL FIELD

Various example embodiments generally relate to the field of charging electric vehicles. In particular, some example embodiments relate to managing charging operations based on a proximity of a user of the electric vehicle to a charging station indicated by a beacon transmitter.

BACKGROUND

Typically, charging of electric vehicles on charging stations require identification of a user unless the charging station is set to free usage for any user. The identification is required especially at charging stations, where people need to pay for charging. To be able to invoice customers, the companies owning the charging stations need to know who is charging there. Currently, when the user wants to charge his electric car, he arrives at a charging station and connects a charging cable of the electric car to the charging station. Thereafter, the user may manually identify oneself to enable start of charging. The station checks if the identification is valid and, if the check is ok, the charging station starts a charging event and the electric vehicle will start charging.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide apparatuses and methods to enable managing a charging station of electric vehicles based on a location of a user. The charging station may be set to a charging mode when the location of the user is determined to be in a proximity of the charging station. The proximity may be determined based on a mobile device of the user detecting a continual broadcast transmitted by a beacon transmitter. The broadcast may comprise an identifier of the charging station and an identifier of a whitelist associated to the specific charging station. The whitelist comprises users for which charging may be initiated at the charging station. Authorization to start the charging may be provided automatically when the user arrives in the proximity of the charging station, without any input required from the user. These benefits may be achieved by the features of the independent claims. Further implementation forms are provided in the dependent claims, the description, and the drawings.

According to a first aspect, an apparatus is provided. The apparatus is configured to obtain an identifier of a user; monitor beacon signals to detect a beacon signal associated to a charging station; obtain an identifier of the charging station and an identifier of a whitelist from the beacon signal; send at least the identifier of the user and the identifier of the whitelist to a server for verifying the user is allowed to start charging at the charging station based on the whitelist; and send a start charging command to the server authorizing initiation of a charging mode at the charging station in response to a successful verification from the server.

In an embodiment, the beacon signal associated to the charging station comprises a predetermined prefix; and the apparatus is configured to obtain the identifier of the charging station and the identifier of the whitelist by decrypting a remaining part of the beacon signal in response to detecting the predetermined prefix from the beacon signal.

In an embodiment, in addition or alternatively, the apparatus is further configured to request a status of the charging station from the server in response to the successful verification; and wherein the start charging command is sent in response to the status indicating that the charging station is available for charging.

In an embodiment, in addition or alternatively, the apparatus is further configured to detect that the beacon signal associated to the charging station is no longer received; request a status of the charging station from the server in response to the beacon signal being no longer received; and send a stop charging command to the server for terminating the charging mode at the charging station in response to the status indicating that the charging station is available for charging.

In an embodiment, in addition or alternatively, the apparatus is configured to obtain an indication that a user permission is required before sending the start charging command; send a notification to the user requesting if the user wants to start charging at the charging station; and wherein the start charging command is sent in response to the user permission.

In an embodiment, in addition or alternatively, the apparatus is configured to send a notification to the user indicating that charging on the charging station is started within a predetermined time interval; and wherein the start charging command is sent in response to no user input received within the predetermined time interval.

According to a second aspect, an apparatus is provided. The apparatus is configured to receive an identifier of a user and an identifier of a whitelist from a client; determine if the whitelist comprises the user to verify the user is allowed to charge at a charging station associated with the whitelist, the whitelist comprising zero or more identifiers of users allowed to charge at the charging station; and send a reply to the client indicating whether the verification was successful.

In an embodiment, the apparatus is further configured to receive an identifier of a charging station; determine if the whitelist is associated to the identifier of the charging station; and send a reply to the client indicating the verification was not successful in response to the whitelist not being associated to the identifier of charging station.

In an embodiment, in addition or alternatively, the apparatus is further configured to receive a start charging command from the client authorizing initiation of a charging mode at the charging station associated with the whitelist; and set the charging station to a charging mode.

In an embodiment, in addition or alternatively, the apparatus is configured to monitor status of the charging station; and terminate the charging mode when no charging is started within a predetermined interval.

In an embodiment, in addition or alternatively, the apparatus is further configured to receive a stop charging command from the client for termination of the charging mode at the charging station; and terminate the charging mode at the charging station.

In an embodiment, in addition or alternatively, the apparatus is configured to obtain an identifier of a charging station to be associated to a whitelist; manage users on the whitelist based on a request for at least one of a removal or an addition of one or more user; and store the whitelist with an identifier of the whitelist, wherein the whitelist comprises the identifier of the charging station and zero or more identifiers of the users allowed to charge on the charging station.

According to a third aspect, an apparatus is provided. The apparatus is configured to obtain an identifier of a charging station; obtain an identifier of a whitelist; and transmit beacon signals comprising the identifier of the charging station and the identifier of the whitelist.

In an embodiment, the beacon signal further comprises a predetermined prefix and the apparatus is configured to encrypt the identifier of the charging station and the identifier of the whitelist.

According to a fourth aspect, an electric vehicle charging system comprising the apparatus of the first aspect; the apparatus of the second aspect; and the apparatus of the third aspect is provided.

According to a fifth aspect, there is provided a method. The method comprises obtaining an identifier of a user; monitoring beacon signals to detect a beacon signal associated to a charging station; obtaining an identifier of the charging station and an identifier of a whitelist from the beacon signal; sending at least the identifier of the user and the identifier of the whitelist to a server for verifying the user is allowed to start charging at the charging station based on the whitelist; and sending a start charging command to the server authorizing initiation of a charging mode at the charging station in response to a successful verification from the server.

According to a sixth aspect, there is provided a method. The method comprises receiving an identifier of a user and an identifier of a whitelist from a client; determining if the whitelist comprises the user to verify the user is allowed to charge at a charging station, the whitelist comprising zero or more identifiers of users allowed to charge at the charging station; and sending a reply to the client indicating whether the verification was successful.

According to a seventh aspect, there is provided a method. The method comprises obtaining an identifier of a charging station; obtaining an identifier of a whitelist; and transmitting beacon signals comprising the identifier of the charging station and the identifier of the whitelist, wherein the beacon signals are transmitted from substantially the same physical location as the charging station to indicate proximity of the charging station.

According to an eighth aspect, a computer program is configured, when executed by an apparatus, to cause the apparatus at least to: obtain an identifier of a user; monitor beacon signals to detect a beacon signal associated to a charging station; obtain an identifier of the charging station and an identifier of a whitelist from the beacon signal; send at least the identifier of the user and the identifier of the whitelist to a server for verifying the user is allowed to start charging at the charging station based on the whitelist; and send a start charging command to the server authorizing initiation of a charging mode at the charging station in response to a successful verification from the server.

According to a ninth aspect, a computer program is configured, when executed by an apparatus, to cause the apparatus at least to: receive an identifier of a user and an identifier of a whitelist from a client; determine if the whitelist comprises the user in order to verify the user is allowed to charge at a charging station, the whitelist comprising zero or more identifiers of users allowed to charge at the charging station; and send a reply to the client indicating whether the verification was successful.

According to a tenth aspect, a computer program is configured, when executed by an apparatus, to cause the apparatus at least to: obtain an identifier of a charging station; obtain an identifier of a whitelist; and transmit beacon signals comprising the identifier of the charging station and the identifier of the whitelist.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of operations for constructing and operating the example. However, the same or equivalent functions and sequences may be accomplished by different examples.

Typically, a user may be identified at a charging station either in response to the user showing his RFID-card to the charging station or the user manually starting the charging from a mobile application where the user has logged in. The charging station then checks from a backend system if the identification is valid, for example, by checking that the RFID-card is active in the system. However, the process is not optimal for stations where people charge every day, like a home charging station or a workplace charging station. The use of RFID-cards or requiring inputs from the user via a user interface of the charging station or the mobile device may be a burdensome task for the user when repeated day after day. It is not really convenient to come home from work and each time get an RFID card from your pocket or open the mobile application—it would be much easier to just come home, connect the charging cable to your car, and to have it start charging automatically. Yet, identification is required also at the home and workplace charging stations to avoid outsiders from being able to charge for free.

Identification may be implemented also with a facial recognition, license plate scanning, or identifying the car through the charging cable. However, these require a separate and complicated hardware to the cars or to the charging stations, which are not really widely in the market yet and may require a costly investment on special equipment. Alternatively, a location of the user may be checked based on GPS coordinates of a mobile device of the user to start a charging process when the user is detected near a predetermined charging station. However, constant GPS tracking of the location of the user consumes a lot of battery from mobile devices. Furthermore, many users do not like the idea that their location is being constantly tracked. Also, mobile device operation systems may have limitations on how long and how often applications can track the location of the user. Hence, there are many reasons why the GPS-tracking based solutions are not optimal for initiating the charging process.

According to an example embodiment, an authorization to enable a user to start charging at a charging station may be provided in response to a mobile device of a user detecting a beacon signal associated with the charging station. The charging station may be caused to change from a standby mode to a charging mode in response to the mobile device detecting the beacon signals. The beacon signals may initiate a verification process to authenticate the user for the charging station before the user has arrived at the charging station. Hence, the charging may be started automatically as soon as the user connects the charging cable.

According to an example embodiment, an apparatus is configured to continually transmit a beacon signal comprising an identifier of a charging station and an identifier of an associated whitelist. The whitelist comprises information of users for which charging may be enabled at the charging station. The identifiers may be encrypted by the apparatus and transmitted together with a prefix configured to trigger a receiving device with a secret key to decrypt the identifiers from the beacon signal. The prefix may enable the receiving device to distinguish the beacon signal associated to a charging station from other signals.

According to an example embodiment, an apparatus is configured to detect a proximity of a charging station based on a received beacon signal. The apparatus may monitor beacon signals and trigger configured operations in response to detecting a predetermined prefix in the beacon signal. The apparatus obtains identifiers associated with the charging station from the beacon signal, and checks validity of an identifier of the user at the respective charging station. The apparatus may be able to determine a distance of the user with respect to the charging station based on the detected beacon signals. The distance may trigger the apparatus to initiate and/or terminate a charging event for the user.

According to an example embodiment, an apparatus is provided to verify if a user is allowed to charge at a specific charging station based on a received identifier of a whitelist and an identifier of a user. At least one whitelist comprising zero or more users allowed to charge at a specific charging station may be stored to a database from which the apparatus may check if the user is comprised in the indicated whitelist. Each whitelist comprises an identifier of the charging station it is associated to, and the apparatus may further receive the identifier of the charging station to map together each of the received identifiers to ensure the user is allowed to start charging at a correct charging station. The apparatus may respond to the sender of the identifiers whether the verification was successful or not. In response, the apparatus may receive a start charging command to authorize the user for charging at the charging station.

An advantage of an example embodiment is that any special hardware may not be required. Only a beacon transmitter, a server and a mobile device capable of detecting signals from the beacon transmitter may be sufficient to realize an objective of the description. Hence, a solution of the description may be compatible with all different existing charging stations. An example embodiment may work with all different manufacturers of charging stations and electric vehicles because it is not dependent on any specific protocols or hardware of the manufacturers. The beacon transmitter may be attached on or by any charging station. Further, the beacon signals may be monitored to authorize the charging by any device configured for wireless communications.

In general, beacon transmitters are small devices that can be used to broadcast information using, for example, a Bluetooth Low Energy-protocol. There are two main beacon transmitter standards at the moment used with mobile devices, Eddystone from Google and iBeacon from Apple. However, example embodiments of this description are not restricted to any specific protocol, and also other existing or future standards may be used. The key benefit with beacon transmitters is that mobile devices can monitor beacon signals in the background and can be programmed to trigger different actions based on beacon proximity.

Advantageously, security may be ensured since the charging may be automatically enabled only at given stations (for example home stations) based on the whitelists. Therefore, it may be ensured that charging is not automatically started for other stations, for example public stations nearby, that the user just happens to pass by. Security may be further ensured by configuring the system to automatically timeout the charging. For example, if the charging mode is set automatically, but the user does not connect his car, then the authorization may be revoked after a given amount of time (for example 5 minutes) to prevent another user to go and charge for free later.

Figure 1:
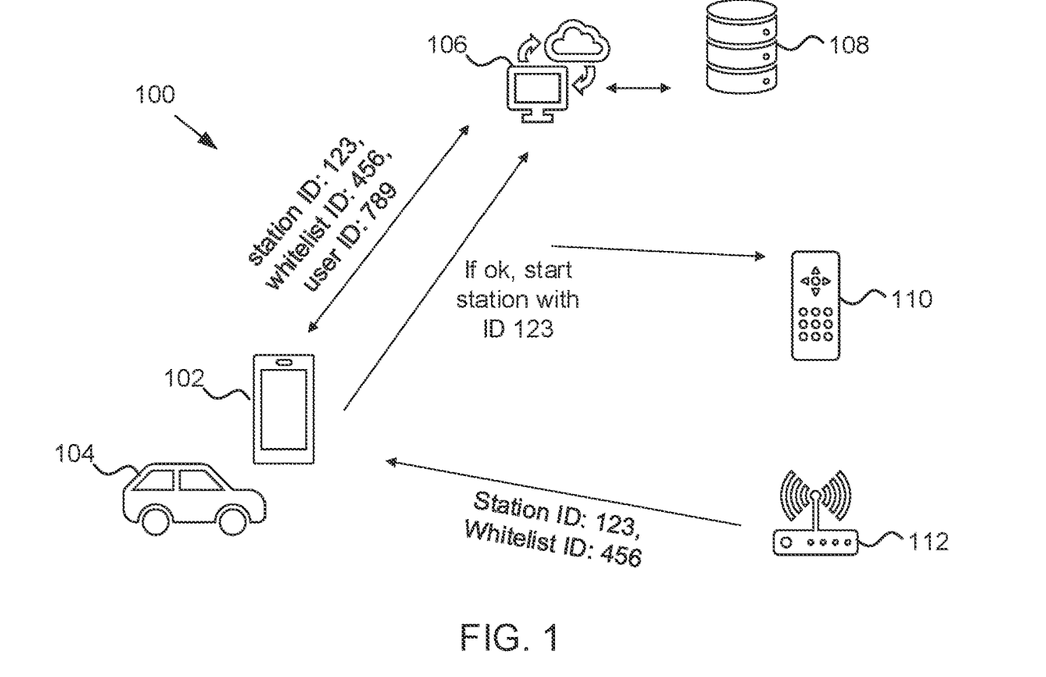
FIG. 1 illustrates an example of an electric vehicle charging system, according to an example embodiment.

FIG. 1 illustrates an example of an electric vehicle charging system 100, according to an example embodiment. The electric vehicle charging system 100 may comprise a mobile device 102 of a user of an electric vehicle 104. The mobile device 102 is configured to communicate wirelessly with a charging management system 106. The mobile device 102 is further configured to receive data from other devices, such as a beacon transmitter 112. The charging management system 106 may comprise a data storage 108 comprising a whitelist database. The charging management system 106 may comprise a server configured to provide charging management as a cloud service for clients, such as the mobile device 102 and a charging station 110. The electric vehicle charging system 100 further comprises at least one charging station 110 and at least one beacon transmitter 112. Each charging station 110 may be associated to one beacon transmitter 112, which beacon transmitter 112 is configured to broadcast a signal for nearby devices.

The charging management system 106 may control the charging stations. The charging management system 106 may communicate with the charging stations 110 and receive information, such as status of the charging stations indicating if an electric vehicle is currently charging at the charging station or if the charging station is available for charging. The charging management system 106 may set the charging stations, for example, either in a charging mode or a standby mode. In the charging mode the charging station is authorized to start charging. In the standby mode the charging station is configured to wait for an authorization before the charging is enabled. A charging event is started when the charging station is set to the charging mode and ended when the charging station is returned to the standby mode.

The beacon transmitter 112 may be attached substantially to the same physical location as the charging station 110. The beacon transmitter 112 may be configured to the charging station 110. Overall, the beacon transmitter 112 may be installed such that the charging station 110 is located within a range of the beacon transmitter 112. Hence, the beacon signals indicate a proximity of the charging station. The beacon signal enables proximity detection by the mobile device 102. The mobile device 102 may detect the beacon transmitter 112 in two stages. The stages may comprise a region monitoring to detect a presence of the beacon transmitter and a beacon transmitter ranging to determine the proximity to a detected beacon transmitter. Ranging may require taking frequent measurements of the strength of the beacon signals and, optionally, computing the distance to the associated beacon transmitters. However, region monitoring involves only passive listening for nearby beacon transmitters, which consumes far less power. Hence, power consumption of the mobile device may be significantly reduced compared to, for example, continuous monitoring of the proximity based on a GPS. The beacon transmitters may be simple and cheap devices. This enables, that the beacon transmitters may not cause any substantial additional costs to the charging stations 110 and the electric vehicle charging system 100. In an embodiment, the distance to the associated beacon transmitter may be used to determine an interval before the charging is enabled. Hence, the charging may not be enabled too early before the user arrives at the station.

The beacon transmitter 112 may be configured to broadcast constantly a simple message that tells an identifier (ID) of the charging station 110 and an identifier of a whitelist associated to users who are allowed to start charging at the specific charging station 110. The charging station 110 may be available also for other users, but if they are not on the whitelist, they may need to authenticate themselves manually at the charging station before the charging is enabled. When the mobile device 102 detects the beacon signal associated with the charging station 110, operations to enable the user to start charging at the charging station 110 are initiated. The operations may be performed by an application running on the mobile device 102. The application may not need to be constantly active, but the application may be resumed by the mobile device 102 when detecting the beacon signal associated to the charging station. Hence, unnecessary consumption of a battery of the mobile device 102 may be avoided as the user may close the application and it will be automatically resumed when the user has arrived within the range of the beacon transmitter 112.

The application may comprise a setting allowing the user to select if the charging should start automatically or if the user wants to be just prompted to start charging. If a user permission is required, the mobile device may send a notification requesting for the user permission in response to the detected beacon signal.

An identifier of the user may be received in response to the user logging in to the application. Hence, the same mobile device 102 may be used by different users and the identifier of the user is obtained based on which of the users is currently logged in. The mobile device 102 may automatically listen to all beacon signals and if it detects a beacon signal associated to a charging station, the application running on the mobile device 102 may be configured to start a process for determining if the charging station can be prepared for charging to the user based on a content of the beacon signal.

The mobile application may make an API (application program interface) call to the charging management system asking: "I am customer [user ID: 789], can I start charging on [charging station ID: 123] and [whitelist ID: 456]?". Alternatively, only the identifier of the user and the identifier of the whitelist are sent. The charging management system has access to the database comprising the whitelists and it may map together the charging station ID, the whitelist ID and the user ID to determine if the user is allowed to charge at the charging station. The charging management system then replies to the mobile application yes or no depending on the outcome. For example, if the received whitelist ID is not associated to the charging station ID, or the user ID is not on the whitelist corresponding to the whitelist ID, the reply is no. If each of the charging station ID, the whitelist ID and the user ID are associated to each other, the reply is yes. If only the user ID and the whitelist ID were sent, it is sufficient that the user is on the respective whitelist.

In response to receiving the verification indicating that the user is allowed to start charging on the charging station, the application may send a start charging command to the charging management system which then prepares the charging station 110 for charging. Based on the setting of the user, the start charging command is either sent automatically or in response to a user input. When the user then arrives to the charging station and connects a charging cable of the electric vehicle, charging will start automatically, since the user has been automatically authorized in the background by the application. Depending on the setting of the user, the charging may be started without any user interaction. The user is not required to even open the application or interact with it. The beacon signals are monitored in the background and the detected beacon signals may trigger actions on the application automatically.

Figure 2:
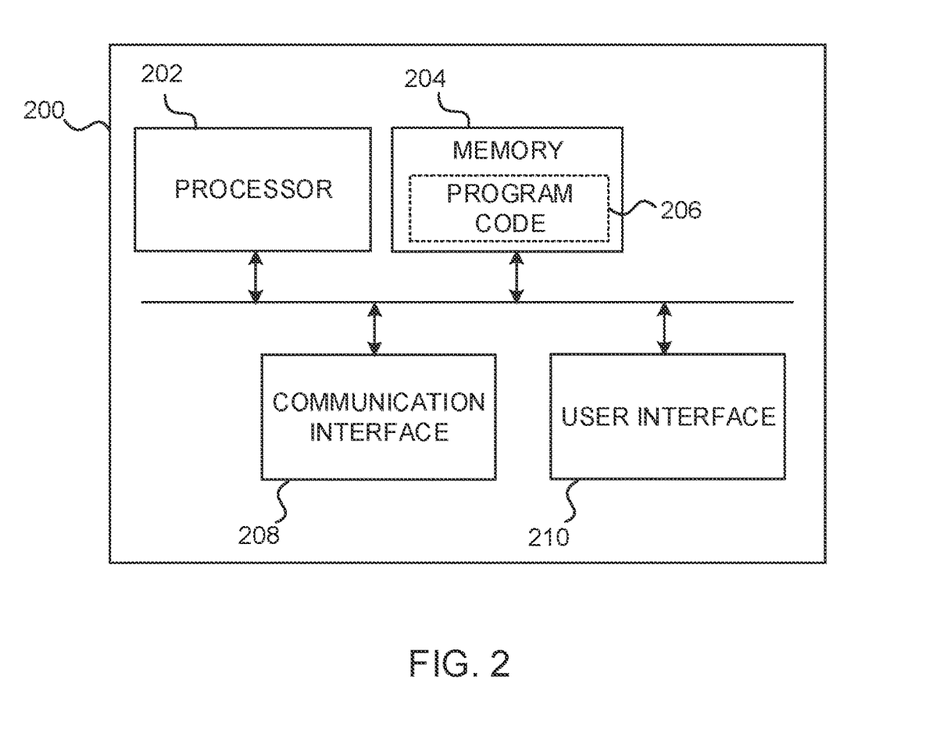
FIG. 2 illustrates an example of an apparatus configured to practice one or more example embodiments, according to an example embodiment.

FIG. 2 illustrates an example of an apparatus 200 configured to practice one or more example embodiments.

The apparatus 200 may comprise at least one processor 202. The at least one processor 202 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 200 may further comprise at least one memory 204. The memory 204 may be configured to store, for example, computer program code or the like, for example operating system software and application software. The memory 204 may comprise one or more volatile memory devices, one or more non-volatile memory devices, and/or a combination thereof. For example, the memory 204 may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 200 may further comprise a communication interface 208 configured to enable the apparatus 200 to transmit and/or receive information, to/from other apparatuses. The communication interface 208 may be configured to provide at least one wireless radio connection, such as for example a 3GPP mobile broadband connection (e.g. 3G, 4G, 5G). However, the communication interface 208 may be configured to provide one or more other type of connections, for example a wireless local area network (WLAN) connection such as for example standardized by IEEE 802.11 series or Wi-Fi alliance; a short range wireless network connection such as for example a Bluetooth, a BLE (Bluetooth low energy), NFC (near-field communication), or RFID connection; a wired connection such as for example a local area network (LAN) connection, a universal serial bus (USB) connection or an optical network connection, or the like; or a wired Internet connection.

The apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus 200 is configured to implement some functionality, some component and/or components of the apparatus 200, such as for example the at least one processor 202 and/or the memory 204, may be configured to implement this functionality. Furthermore, when the at least one processor 202 is configured to implement some functionality, this functionality may be implemented using program code 206 comprised, for example, in the memory 204.

The functionality described herein may be performed, at least in part, by one or more computer program product components such as software components. According to an embodiment, the apparatus 200 comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 200 comprises means for performing at least one method described herein. In one example, the means comprises the at least one processor, the at least one memory including program code configured to, when executed by the at least one processor, cause the apparatus to perform the method.

The apparatus 200 may comprise for example a computing device such as for example a server device, a client device, a mobile phone, a smartwatch, a tablet computer, a laptop, a charging station, an electric vehicle, a beacon transmitter, or the like. Although the apparatus 200 is illustrated as a single device it is appreciated that, wherever applicable, functions of the apparatus 200 may be distributed to a plurality of devices, for example, to be performed in a cloud system.

Figure 3:
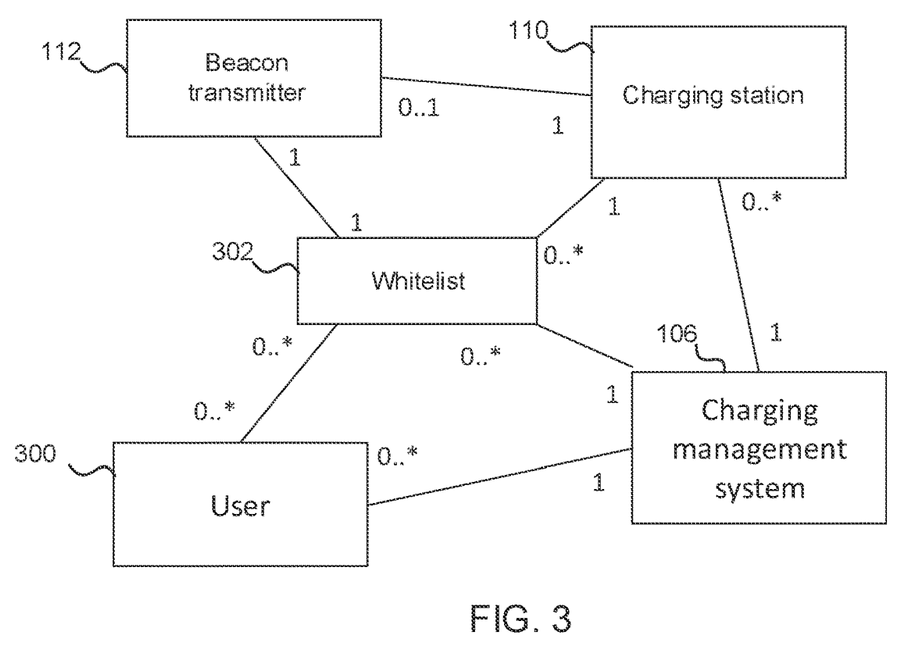
FIG. 3 illustrates an example of an information model of an electric vehicle charging system, according to an example embodiment.

FIG. 3 illustrates an example of an information model of an electric vehicle charging system, according to an example embodiment. The information model may represent relationships and constraints between entities of the electric vehicle charging system 100.

The information model comprises at least one beacon transmitter 112 and at least one charging station 110. Each beacon transmitter 112 may be linked to a single charging station 110. The beacon transmitter 112 may comprise an identifier of the charging station 110 and an identifier of a whitelist 302 associated with the charging station 110. Each charging station 110 may be associated to one whitelist 302. The whitelist 302 comprises a list of users which may be automatically authorized to charge at the charging station defined by the beacon transmitter. Each charging station 110, each whitelist 302, and each user 300 comprises an individual identifier. Each whitelist 302 may comprise zero or more identifiers of users 300. One user may be on more than one whitelist, and users may be added or removed from the whitelists.

A charging management system 106 comprises information of the different users 300, the charging stations 110 and the whitelists 302. The charging management system 106 may be configured to obtain a single identifier of a user, an identifier of a charging station and an identifier of a whitelist as an input and map them together. The mapping may verify if the whitelist is associated to the charging station, and further if the user is on the whitelist. The charging management system 106 may output the result of the mapping to indicate if the user is authorized to start charging at the charging station. The charging management system 106 comprises means to monitor and control each charging station 110.

Figure 4:
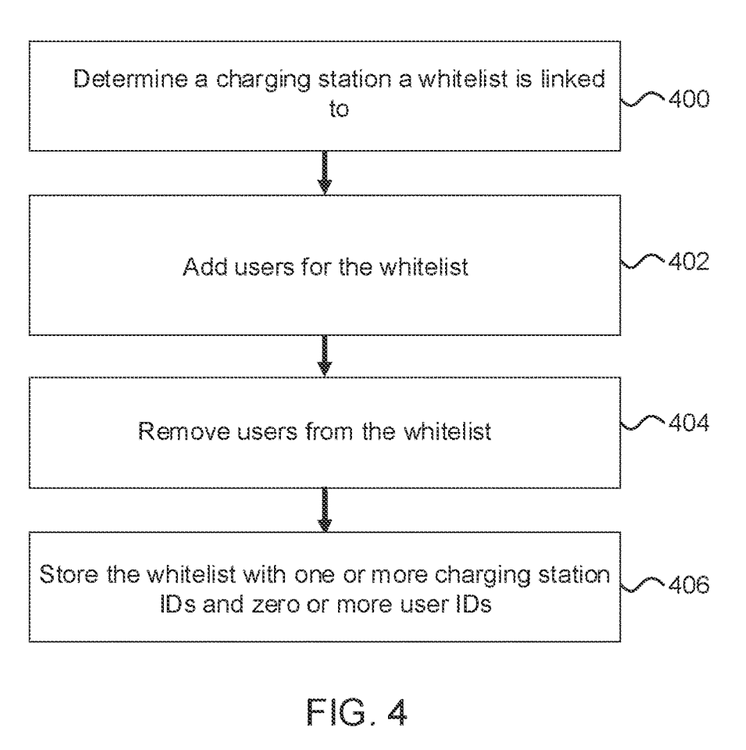
FIG. 4 illustrates an example of a flow diagram for configuring a whitelist associated to a charging station, according to an example embodiment.

FIG. 4 illustrates an example of a flow diagram for configuring a whitelist associated to a charging station, according to an example embodiment. The procedure of FIG. 4 may be executed at the mobile device 102, the charging management system 106, or another device. The whitelist may be created and modified by an owner of the charging station, for example, from a mobile application or from a web-based admin interface. The whitelist may be then stored to the charging management system 106.

At 400, a charging station to which the whitelist is linked to is determined. One whitelist may be linked to one or more charging stations. For example, in case a company has multiple charging stations on a parking lot for its employees, a whitelist comprising the employees may be linked to each of the charging stations. Once the charging station is selected and an identifier of the charging station is obtained, users on the whitelist associated to the charging station may be managed. At 402, users may be added on the whitelist. At 404, users may be removed from the whitelist. At 406, the whitelist created based on the selections at operations 400, 402 and 404 is stored. The whitelist may comprise one or more identifiers of the charging stations and zero or more identifiers of the users which are allowed to start charging on the associated charging station. The whitelist may be stored to a database to later verify if charging process can be started to a certain user at a certain charging station based on the identifiers of the user, the whitelist and the charging station.

Figure 5:
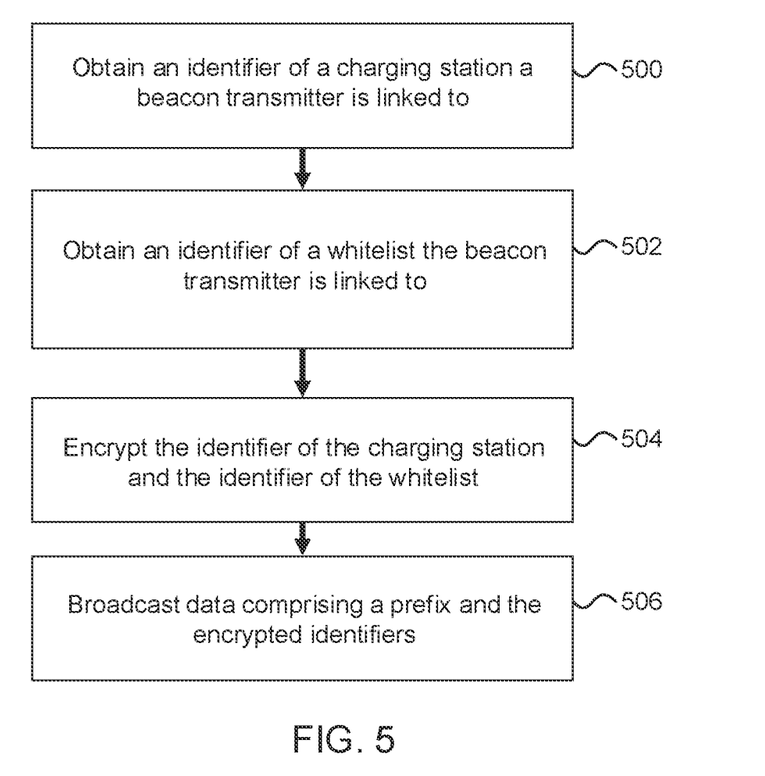
FIG. 5 illustrates an example of a flow diagram for configuring a beacon transmitter, according to an example embodiment.

FIG. 5 illustrates an example of a flow diagram for configuring a beacon transmitter, according to an example embodiment.

At 500, an identifier of a charging station to which the beacon transmitter is linked to is obtained by the beacon transmitter. At 502, an identifier of a whitelist to which the beacon transmitter is linked to is obtained by the beacon transmitter. At 504, the beacon transmitter may encrypt the identifier of the charging station and the identifier of the whitelist. At 506, the beacon transmitter may broadcast a beacon signal comprising the identifiers. In an embodiment, the beacon signal may comprise a predetermined prefix and the encrypted identifiers. The predetermined prefix may be an indication that the beacon signal is associated to a charging station. The predetermined prefix may be, for example, a company's URL prefix or another identifier. The beacon signal may be repeatedly transmitted by the beacon transmitter at a regular interval. The beacon signal may indicate a near-by presence of the charging station. The beacon signal may be configured to trigger actions at receiving mobile devices.

Figure 6:
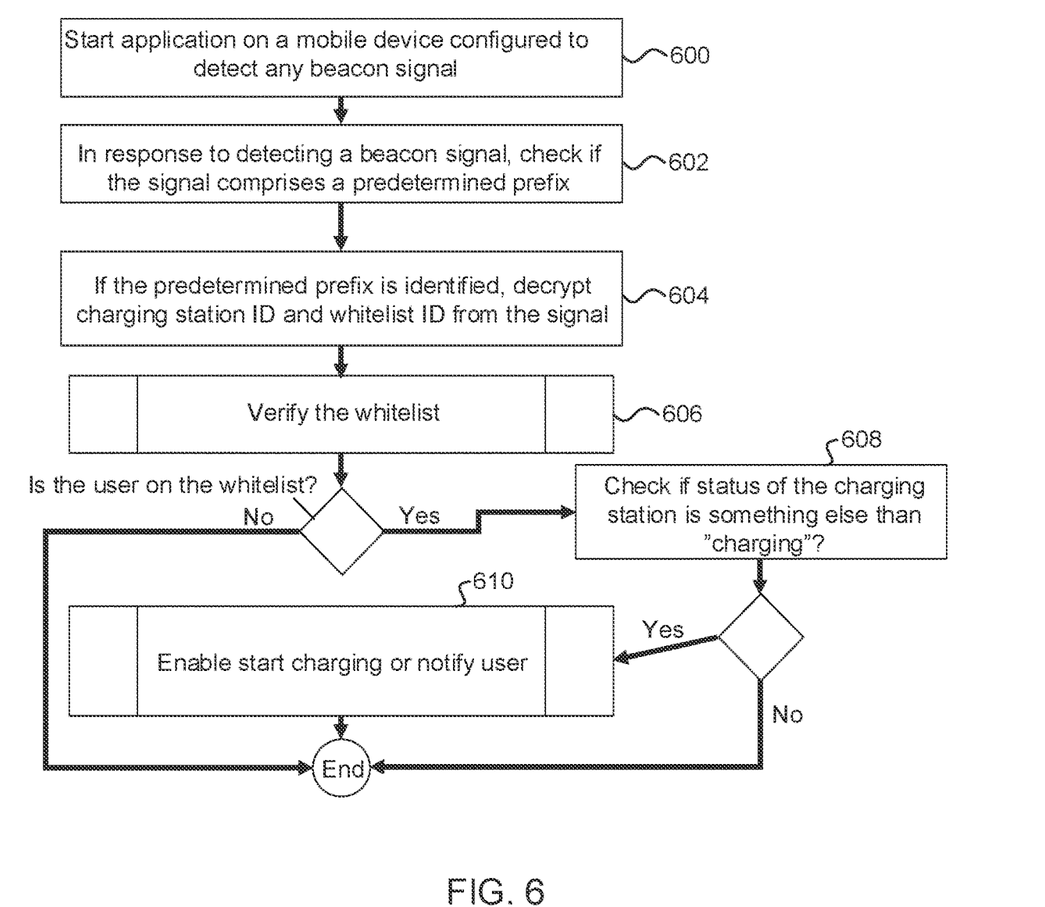
FIG. 6 illustrates an example of a flow diagram for monitoring beacon signals to enable start charging based on a proximity of a charging station, according to an example embodiment.

FIG. 6 illustrates an example of a flow diagram for monitoring beacon signals to enable start charging based on a proximity of a charging station, according to an example embodiment.

At 600, an application is started on a mobile device configured to listen to any beacon signals. The mobile device may be, for example, a mobile phone, a smartwatch or a tablet computer. In an embodiment, the mobile device may be comprised in an electric vehicle of the user. The application may be started by a user or by the mobile device.

At 602, a beacon signal is detected by the mobile device. In response, it may be checked if the beacon signal comprises a predetermined prefix. If the predetermined prefix is identified, a remaining part of the signal may be decrypted by the application at 604. The decrypted message may comprise an identifier of the charging station and an identifier of a whitelist. At 606, the whitelist may be verified. The verification may comprise checking from a backend if the whitelist is associated to the charging station, i.e. that a correct identifier of the whitelist and the charging station is received. Importantly, it is checked if the user is on the whitelist. The application may have obtained an identifier of the user when the user logged in to the application. The application may provide at least the user's identifier and the identifier of the whitelist to a server comprising a database of whitelists. The server may compare the identifier of the user to identifiers of the users on the whitelist and respond to the application if the comparison was successful or not. If the user is on the whitelist, a status of the charging station may be checked at 608. The application may request the status from the server. If the status of the charging station is anything else than "charging", the charging station may be available for charging and the process proceeds to 610. The "charging" status may be received if a charging cable is connected to the charging station and/or an electric vehicle meaning that somebody is currently charging his vehicle. At 610, a process to enable the user to start charging at the at the charging station may be started. Alternatively, the user may be notified that the charging may be started on a permission of the user.

Figure 7:
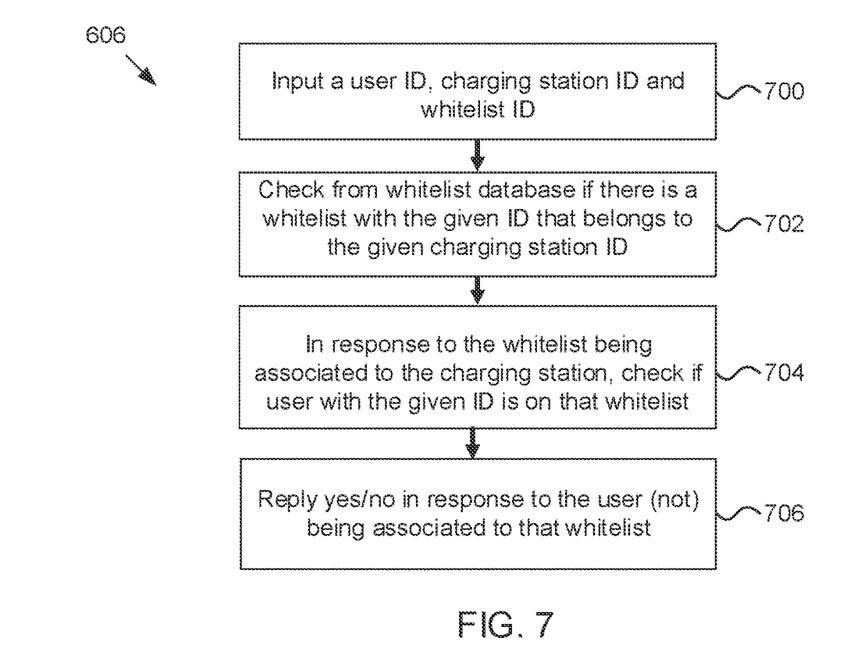
FIG. 7 illustrates an example of flow diagram for verifying charging can be started for a user at a specific charging station, according to an example embodiment.

FIG. 7 illustrates an example of a flow diagram for verifying that a charging event can be started for a user at a specific charging station, according to an example embodiment. The charging event is initiated when the charging station is set to a charging mode for an authorized user. When the charging event is terminated the charging station may be set to a standby mode, and charging is no longer possible until a new authorization is received. The flow diagram illustrates a subprocess of the application corresponding to operation 606 in FIG. 6. The verification may be performed by the server of the charging management system 106.

At 700, the identifier of the charging station, the identifier of the whitelist and the identifier of the user may be provided as an input from the application to API for verification in the backend server. At 702, a whitelist database may be checked to determine if there is a whitelist with the given identifier that belongs to the charging station with the given identifier. If the whitelist with the given identifier is associated to the charging station with the given identifier, at 704 it is then determined if the user with the given identifier is on the whitelist. At 706, a reply indicating whether the user was on the whitelist or not is provided for the application.

Figure 8:
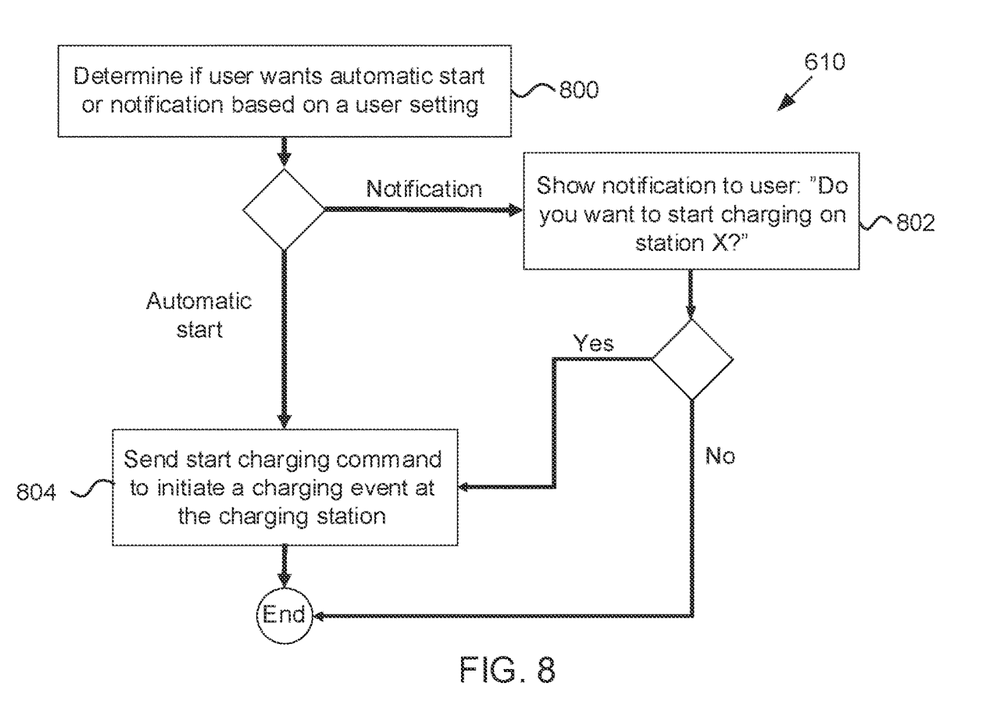
FIG. 8 illustrates an example of a flow diagram for initiating a charging event based on a user setting, according to an example embodiment.

FIG. 8 illustrates an example of a flow diagram for initiating a charging event based on a user setting, according to an example embodiment. The flow diagram illustrates a subprocess of the application corresponding to the operation 610 in FIG. 6. The procedure of FIG. 8 may be executed at the mobile device 102.

At 800, it is determined if the user wants an automatic start or a notification based on the user setting. Depending on the user setting, the subprocess proceeds to operation 802 or 804. At 802, a notification is shown to the user. The notification may comprise, for example, a request saying: "Do you want to start charging on station X?". If the user responds yes, the subprocess proceeds to the operation 804. At 804, an authorized start charging command is sent to initiate the charging event at the charging station. The start charging command may be sent to the server configured to manage the charging stations and set the charging station to a charging mode to initiate the charging event. The start charging command may be associated with the user and the specific charging station such that the user is authorized to use the charging station by the management system, i.e. no authorization is required at the time the user actually arrives at the charging station. Hence, the charging event may be started automatically in response to the user arriving in proximity of the charging station. Alternatively, the charging event may be initiated in response to a user input giving a permission to send the start charging command. In an embodiment, the application may send a notification to the user indicating that charging on the charging station is started within a predetermined time interval. The start charging command may be sent in response to no user input received within the predetermined time interval. Hence, the user may be provided an option to cancel the automatic start in case he does not want to charge this time but the proximity of the charging station has triggered the preparations for the charging. In an embodiment, the server may be configured to monitor the charging station and if no charging is started within a predetermined interval, the server may cancel or terminate the charging mode. Hence, the charging event is automatically terminated in case the user does not arrive at the charging station and start charging his electric vehicle.

Figure 9:
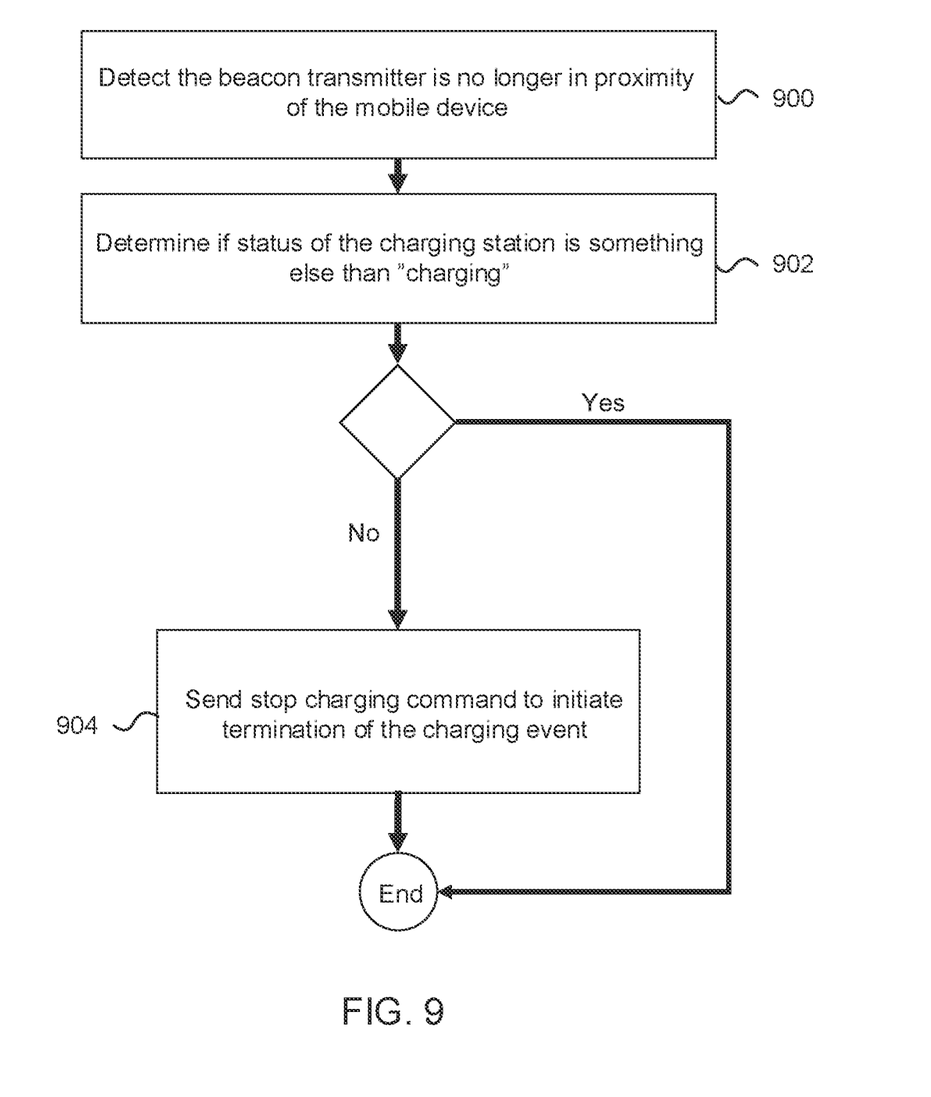
FIG. 9 illustrates an example of a flow diagram for terminating a charging event based on a user location, according to an example embodiment.

FIG. 9 illustrates an example of a flow diagram to terminate a charging event based on a user location, according to an example embodiment. The charging event may have been previously started in response to the mobile device receiving the beacon signals from the beacon transmitter, as previously described. The procedure of FIG. 9 may be executed by the mobile device 102.

At 900, it is detected that the beacon transmitter is no longer in proximity of the mobile device. For example, the mobile device may no longer receive the beacon signals associated to the charging station. The beacon signals may be no longer received by the mobile device in response to the mobile device leaving a range of the beacon transmitter.

At 902, it is determined if a status of the charging station is something else than "charging". The status may be enquired from the server of the charging management system 106. If the status corresponds to "charging", it indicates that the user may have left the electric vehicle charging while the user himself has left the proximity of the charging station with the mobile device, to come back later. Hence, the charging may be kept running. However, if the status of the charging station indicates that the charging station is available for charging, i.e. nobody is currently charging there, it indicates that the user has disconnected the charging cable of his electric vehicle and may have driven away from the charging station with the mobile device 102. In response, at 904, the mobile device 102 sends a stop charging command to initiate termination of the charging event. The stop charging command may be received by the server which then handles the termination with the charging station. The server may set the charging station from the charging mode to a standby mode, in which charging can not be started until an authorization to start the charging is received.

Further features of the method(s) directly result for example from functionalities of the apparatuses described throughout the specification and in the appended claims, and are therefore not repeated here. Different variations of the method(s) may be also applied, as described in connection with the various example embodiments.

An apparatus may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

The terms "automated", "automatically", "automatic" and variations thereof, as used herein, may refer to any process or operation done without human input when the process or operation is performed. However, a process or operation can be automatic, even though performance of the process or operation uses human input, if the input is received before performance of the process or operation.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A mobile device, the mobile device configured to:
   obtain an identifier of a user;
   monitor beacon signals to detect a beacon signal associated to a charging station;
   obtain an identifier of the charging station and an identifier of a whitelist from the beacon signal;
   send the identifier of the user, the identifier of the charging station and the identifier of the whitelist to a server for verifying the user is allowed to start charging at the charging station based on the identifier of the whitelist, the identifier of the charging station and the identifier of the user; and
   send a start charging command to the server authorizing initiation of a charging mode by the server at the charging station in response to a successful verification from the server, wherein the user is authorized to start the charging mode automatically when the user arrives in a proximity of the charging station, without an input required from the user to authorize charging at the charging station.

2. The mobile device of claim 1, wherein the beacon signal associated to the charging station comprises a predetermined prefix; and
   the mobile device is configured to obtain the identifier of the charging station and the identifier of the whitelist by decrypting a remaining part of the beacon signal in response to detecting the predetermined prefix from the beacon signal.

3. The mobile device of claim 1, further configured to:

request a status of the charging station from the server in response to the successful verification; and wherein the start charging command is sent in response to the status indicating that the charging station is available for charging.

4. The mobile device of claim 1, configured to:

detect that the beacon signal associated to the charging station is no longer received;

request a status of the charging station from the server in response to the beacon signal being no longer received; and send a stop charging command to the server for terminating the charging mode at the charging station in response to the status indicating that the charging station is not currently charging.

5. The mobile device of claim 1, configured to:

obtain an indication that a user permission is required before sending the start charging command;

send a notification to the user requesting if the user wants to start charging at the charging station; and wherein the start charging command is sent in response to the user permission.

6. The mobile device of claim 1, further configured to:

send a notification to the user indicating that charging on the charging station is started within a predetermined time interval; and wherein the start charging command is sent in response to no user input received within the predetermined time interval.

7. An apparatus, the apparatus configured to:

receive an input comprising an identifier of a user, an identifier of a charging station and an identifier of a whitelist from a mobile device;

determine if the identifier of the whitelist is associated to the identifier of the charging station and if the whitelist comprises the user to verify the user is allowed to charge at a charging station associated with the whitelist, the whitelist comprising zero or more identifiers of users allowed to charge at the charging station; and send a reply to the mobile device indicating whether the verification was successful.

8. The apparatus of claim 7, further configured to:

set the charging station associated with the whitelist to a charging mode in response to receiving a start charging command from the mobile device authorizing initiation of the charging mode at the charging station; and terminate the charging mode in response to receiving a stop charging command from the mobile device.

9. The apparatus of claim 8, further configured to:

monitor a status of the charging station set to the charging mode; and terminate the charging mode when no charging is started at the charging station within a predetermined interval.

10. An apparatus, the apparatus configured to:

obtain an identifier of a charging station;

obtain an identifier of a whitelist;

transmit beacon signals comprising the identifier of the charging station and the identifier of the whitelist for indicating proximity of a charging station to enable start charging at the charging station.

11. The apparatus of claim 10, wherein the beacon signal further comprises a predetermined prefix and the apparatus is configured to:

encrypt the identifier of the charging station and the identifier of the whitelist.

* * * * *